(12) United States Patent
Ayyagari et al.

(10) Patent No.: US 9,817,402 B1
(45) Date of Patent: Nov. 14, 2017

(54) APPLICATION OF FACTORY AUTOMATION FOR AN AIRLINE ASSEMBLY AND BUILD PROCESS

(71) Applicant: The Boeing Company, Chicago, IL (US)

(72) Inventors: Arun Ayyagari, Seattle, WA (US); Thi Q. Nguyen, Everett, WA (US); Ngoc S. Le, Everett, WA (US); David H. Amirehteshami, Mill Creek, WA (US); Benjamin J. Ivers, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/208,437

(22) Filed: Jul. 12, 2016

(51) Int. Cl.
*G05D 1/00* (2006.01)
*G05D 1/02* (2006.01)
*B64F 5/00* (2017.01)

(52) U.S. Cl.
CPC ........... *G05D 1/024* (2013.01); *B64F 5/0009* (2013.01); *G05D 1/0212* (2013.01)

(58) Field of Classification Search
CPC ...... G05D 1/024; G05D 1/0212; B64F 5/0009
See application file for complete search history.

(56) References Cited

U.S. PATENT DOCUMENTS 5,852,672 A * 12/1998 Lu .................. G01B 11/2441
356/604
6,411,915 B1 * 6/2002 Nguyen ............... F01D 21/003
382/294
7,672,500 B2 * 3/2010 Albeck ............ G05B 19/41875
382/141

(Continued)

OTHER PUBLICATIONS

Röwekämper, J., Sprunk, C., Tipaldi, G.D., Stachniss, C., Pfaff, P. and Burgard, W., "On the position accuracy of mobile robot localization based on particle filters combined with scan matching," 2012 IEEE/RSJ International Conference on Intelligent Robots and Systems, pp. 3158-3164 (Oct. 2012), www.ais.informatik.uni-freiburg.de/publications/papers/roewekaemper12iros.pdf, as downloaded Jul. 12, 2016.

(Continued)

*Primary Examiner* — Behrang Badii
*Assistant Examiner* — Daniel L Greene
(74) *Attorney, Agent, or Firm* — Gates & Cooper LLP

(57) ABSTRACT

Work cell and factory level automation require that an Automated Guided Vehicle (AGV) achieve demanding positional accuracy and repeatability relative to a cradle fixture or workstand within a work cell. The AGV makes distance measurements of objects within the work cell using laser scanner sensors. The distance measurements are filtered of objects that are not target features on the cradle fixture or workstand. Systematic or bias errors of the laser scanner sensor are removed from the filtered distance measurements, and a mathematical filter or estimator is applied to the filtered distance measurements using random errors of the laser scanner sensor to generate estimated distance measurements. A map of the target features is then constructed using the estimated distance measurements, wherein the map is used for path planning and navigation control of the AGV relative to the cradle fixture or workstand within the work cell.

26 Claims, 7 Drawing Sheets

(56) References Cited

U.S. PATENT DOCUMENTS

| | | | | |
|---|---|---|---|---|
| 9,602,974 B2* | 3/2017 | Rudow | ............... | H04W 4/028 |
| 9,612,316 B1* | 4/2017 | Griesmeyer | ......... | G01S 5/0294 |
| 2003/0164952 A1* | 9/2003 | Deichmann | ............. | A61B 1/05 |
| | | | | 356/603 |
| 2003/0191568 A1* | 10/2003 | Breed | ................ | B60W 40/06 |
| | | | | 701/36 |
| 2004/0128102 A1* | 7/2004 | Petty | ................... | G01S 17/875 |
| | | | | 702/150 |
| 2005/0060092 A1* | 3/2005 | Hablani | ................. | B64G 1/24 |
| | | | | 701/472 |
| 2009/0080766 A1* | 3/2009 | Daxauer | ............ | G01B 11/2545 |
| | | | | 382/154 |
| 2010/0217437 A1* | 8/2010 | Sarh | ....................... | B64F 5/10 |
| | | | | 700/248 |
| 2011/0224956 A1* | 9/2011 | Ye | ............................ | G03F 1/14 |
| | | | | 703/1 |
| 2014/0207282 A1* | 7/2014 | Angle | ................. | H04L 12/282 |
| | | | | 700/257 |
| 2015/0015700 A1* | 1/2015 | Becker | ................ | G01B 11/14 |
| | | | | 348/136 |
| 2016/0016312 A1* | 1/2016 | Lawrence, III | ........ | G01B 11/24 |
| | | | | 700/98 |
| 2016/0282110 A1* | 9/2016 | Vagman | ................ | G01B 21/04 |

OTHER PUBLICATIONS

Simultaneous localization and mapping, www.en.wikipedia.org/wiki/Simultaneous_localization_and_mapping, as downloaded Jul. 12, 2016. 6 pages.

* cited by examiner

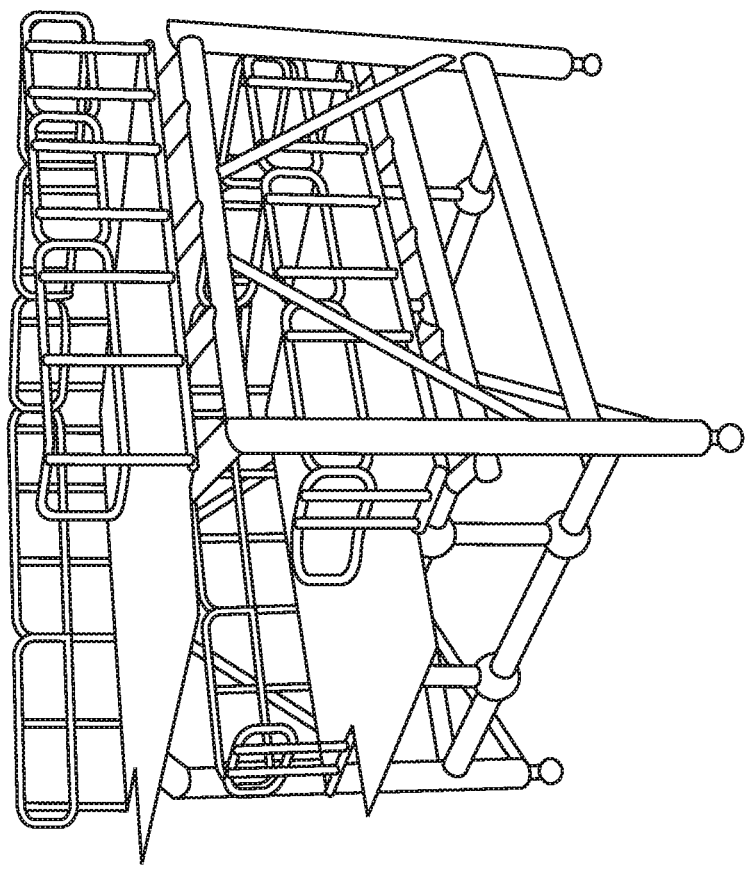

APPLICATION OF FACTORY AUTOMATION FOR AN AIRLINE ASSEMBLY AND BUILD PROCESS

BACKGROUND INFORMATION

1. Field

The invention is related generally to the field of factory automation, and more particularly, to the application of factory automation for an airplane assembly and build process.

2. Background

Work cell and factory level automation for an airplane assembly and build process usually is comprised of specific work cells for forward and aft fuselages, respectively. A typical work cell includes multiple cradle fixtures to hold and position the fuselage assembly and a workstand. Work cell and factory level automation typically requires that Automated Guided Vehicles (AGVs), which carry robots on both the inside and outside of the fuselage, achieve demanding positional accuracy and repeatability relative to the fuselage assembly on a cradle fixture, in order for the robots on the AGVs inside the fuselage to work in a coordinated manner with the robots on the AGVs outside the fuselage.

Path planning and navigation for the AGVs outside the fuselage are guided by laser scanner sensors mounted on each of the four sides of the AGV. These laser scanner sensors are able to measure the distance to an object in its Field of View (FoV) and these ranging distances to objects within its Field of Regard (FoR) are used by an AGV controller to construct a contour or map in a two-dimensional (2-D) plane of view for use in the path planning and navigation.

There are two areas for improvement: (1) the AGV's accuracy and repeatability in returning to taught node positions within a particular work cell, and (2) the AGV's ability to use the same taught node positions, with cradle fixtures and a workstand within the particular work cell, across other work cells using other sets or copies of similar cradle fixtures and workstands.

With regard to area (1), the AGV, as it approaches or is at the taught node position within a work cell, adjacent to cradle fixtures and/or a workstand, may use any or all of the laser scanner sensors on each of the four sides of the AGV. However, from an operational perspective, the laser scanner sensor that is directly facing and/or adjacent to the cradle fixtures and/or workstand is the ideal one to be used. The other laser scanner sensors that are on the back and sides of the AGV may or may not be able to effectively view the target features on the cradle fixtures and/or workstand. The laser scanner sensor being used by the AGV scans across 190 degrees in discrete steps, whereby it measures the distance to the object within its laser beam path using an optical pulse time-of-flight measurement principle. Distance measurements to the object within the laser scanner sensor's beam path include systematic or bias and statistical random errors. The laser scanner sensor's 5 sigma measurement error (systematic or bias and statistical random errors) is an order of magnitude greater that the desired AGV accuracy and repeatability in returning to the taught node positions within a work cell and hence simple measurement averaging of the measured distances will not be adequate.

With regard to area (2), the AGV's ability to use the same taught node positions, with the cradle fixtures and workstand within the particular work cell, across other work cells using other sets or copies of similar cradle fixtures and workstands, is a challenge due to variability in the objects other than the target features within the laser scanner sensor's Field of Regard (FoR) and Field of View (FoV) within the particular work cell. It is assumed that the target features on a cradle fixture or workstand in a work cell are replicated, with metrological accuracy, on other sets or copies of similar cradle fixtures and workstands across other work cells. Given that the laser scanner sensor scans across 190 degrees and with a ranging distance specification of 49 meters, there is a high likelihood that, in an operational environment, other static and dynamic objects other than the target features on the cradle fixture and workstand may be picked up, and thereby cause mapping ambiguity and issues with the AGV's path planning and navigation to move to the desired node position within the work cell adjacent to the cradle fixtures and/or workstand.

Therefore, there is a need in the art for improvements to the application of factory automation for an airplane assembly and build process.

SUMMARY

To overcome the limitations in the prior art described above, and to overcome other limitations that will become apparent upon reading and understanding the present specification, the present invention discloses a method and apparatus for work cell and factory level automation using an AGV having one or more laser scanning sensors.

One or more calibrations are performed of the laser scanner sensors on the AGV to determine systematic or bias errors and random errors in the distance measurements made by the laser scanner sensors. The calibrations are offline calibrations of the laser scanner sensors on the AGV against target reference points to determine the systematic or bias errors or a distribution and standard deviation of the random errors in the distance measurements made by the laser scanner sensors. The distribution of the random errors comprises a Gaussian distribution or is stored in a table when the distribution does not comprise a Gaussian distribution.

One or more distance measurements are made of one or more objects within a work cell using the laser scanner sensors on the AGV. Specifically, the distance measurements are made to the objects in the FoV of the laser scanner sensor on the AGV at each angular index step across the FoR of the laser scanner sensor on the AGV. In one embodiment, the distance measurements are made using only the laser scanner sensor on the AGV that is directly facing or adjacent to the cradle fixture or workstand within the work cell. In another embodiment, the distance measurements are made using more than one of the laser scanner sensors on the AGV across the FoR of the laser scanner sensors on the AGV.

The distance measurements are filtered of the objects that are not target features on a cradle fixture or workstand within the work cell. A convex zone is defined around each of the target features to exclude the objects that are not the target features. A distance margin between a perimeter of the target features and a perimeter of the defined convex zone is sufficiently small, such that no other static or dynamic objects occupy an annulus space formed between the perimeter of the target features and the perimeter of the defined convex zone. The distance measurements that are outside a threshold bounds of the convex zones defined around each of the target features are filtered, yielding the filtered distance measurements for each of the objects in an FoR of the laser scanner sensor on the AGV.

Systematic or bias errors of the laser scanner sensor are removed from the filtered distance measurements.

A mathematical filter or estimator is applied to the filtered distance measurements using random errors of the laser scanner sensor to generate estimated distance measurements.

Finally, a map of the target features in a 2-D plane of view is constructed using the estimated distance measurements. The constructed map is used for path planning and navigation control of the AGV relative to the cradle fixture or workstand within the work cell. Specifically, the constructed map enables the AGV to accurately and repeatedly return to one or more taught node positions within the work cell. In addition, when the work cell is a reference work cell, the constructed map enables the AGV or another AGV to accurately and repeatedly return to the taught node positions within one or more other work cells, when a cradle fixture or workstand within the other work cells is positioned in the same manner as the cradle fixture or workstand within the reference work cell.

DRAWINGS

Referring now to the drawings in which like reference numbers represent corresponding parts throughout:

FIG. 1B illustrates a workstand that can be used in the typical work cell layout, according to one embodiment.

DETAILED DESCRIPTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Figure 1A:
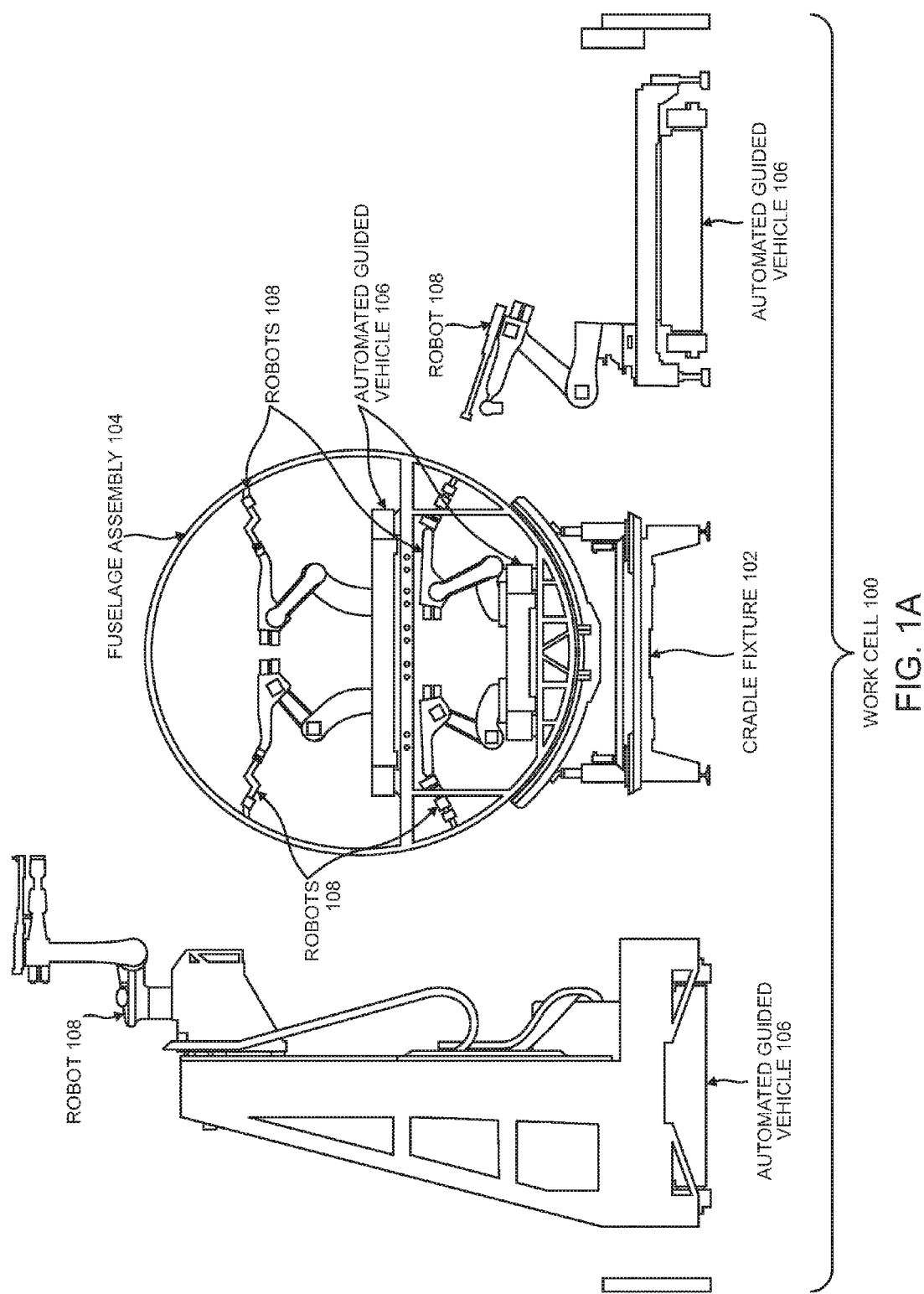
FIG. 1A illustrates a typical work cell layout, according to one embodiment.

FIG. 1A illustrates a typical work cell 100 layout that includes one or more cradle fixtures 102 to hold and position a fuselage assembly 104. One or more AGVs 106 carry robots 108 both inside and outside of the fuselage assembly 104. The typical work cell 100 layout may also include a workstand 110, as illustrated in FIG. 1B, which may be positioned anywhere within the work cell 100.

Work cell and factory level automation require that the AGVs 106 achieve demanding positional accuracy and repeatability relative to the cradle fixtures 102 or workstands 110, so that the robots 108 outside the fuselage assembly 104 can work in a coordinated manner with the robots 108 inside the fuselage assembly 104. In one embodiment, the AGVs 106 construct maps for path planning and navigation, wherein the maps comprise digital representations of objects in the work cell 100 represented in a 2-D plane of view.

Figure 1C:
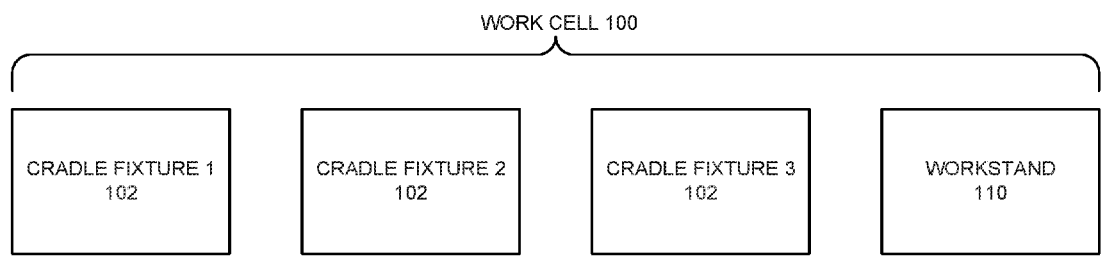
FIGS. 1C, 1D and 1E illustrates maps of a typical work cell, according to one embodiment.

FIG. 1C illustrates a map of the typical work cell 100 layout that includes multiple cradle fixtures 102, also labeled as cradle fixtures 1, 2 and 3, that hold and position a fuselage assembly (not shown), as well as a workstand 110.

Figure 1D:
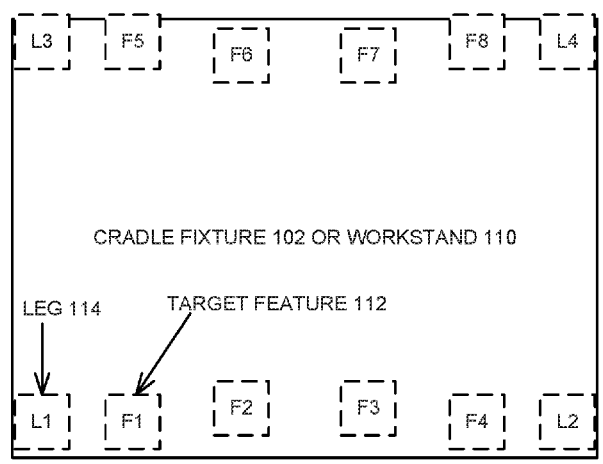

FIG. 1D is a top or plan view of a cradle fixture 102 or workstand 110 of FIG. 1C, which includes target features 112, also labeled as F1, F2, F3, F4, F5, F6, F7 and F8, and legs 114, also labeled as L1, L2, L3 and L4. Both the target features 112 and the legs 114 are shown with dashed outlines indicating that they are hidden in the top or plan view underneath the cradle feature 102 or workstand 110. In one embodiment, the target features 112 are alignment aids mounted on the cradle feature 102 or workstand 110, while the legs 114 are support structures for the cradle feature 102 or workstand 110. Moreover, the configuration of target features 112 on the cradle feature 102 or workstand 110 uniquely identify the type or function of the cradle feature 102 or workstand 110.

Figure 1E:
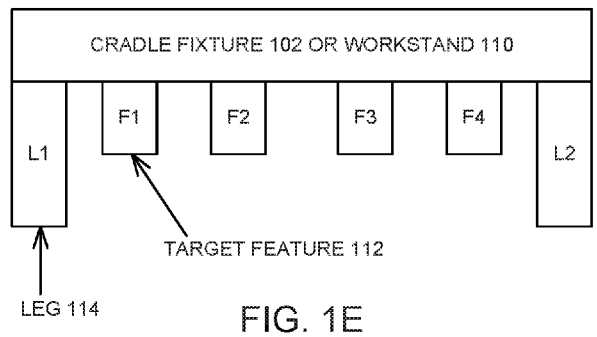

FIG. 1E is an elevation view of the cradle fixture 102 or workstand 110 of FIGS. 1C and 1D, which includes target features 112, also labeled as F1, F2, F3 and F4, and legs 114, also labeled as L1 and L2. Both the target features 112 and the legs 114 are shown with solid outlines indicating that they are not hidden in the elevation view of the cradle feature 102 or workstand 110.

Figure 1F:
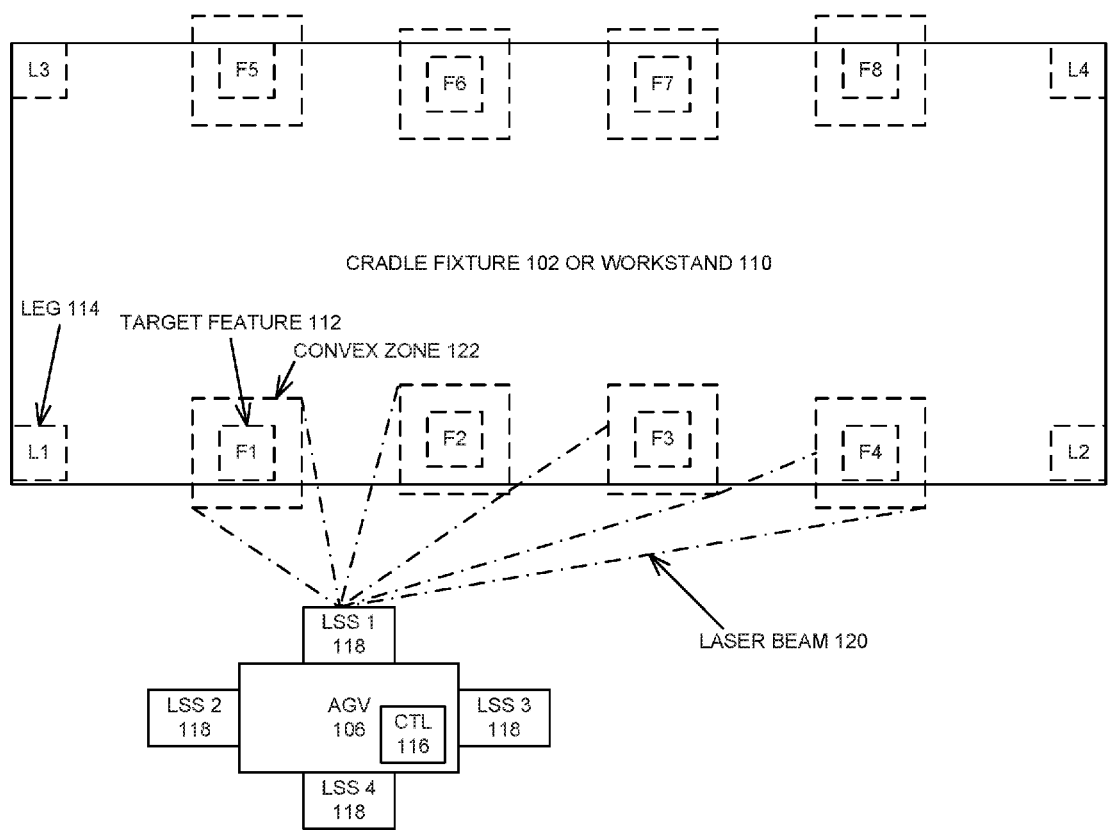
FIG. 1F is a schematic illustrating the use of an automated guided vehicle with laser scanning sensors, according to one embodiment.

FIG. 1F is a top or plan view of a cradle fixture 102 or workstand 110, which includes target features 112, also labeled as F1, F2, F3, F4, F5, F6, F7 and F8, and legs 114, also labeled as L1, L2, L3 and L4. Both the target features 112 and the legs 114 are shown with dashed outlines indicating that they are hidden in the top or plan view underneath the cradle feature 102 or workstand 110.

In FIG. 1F, an AGV 106 operates in the vicinity of the cradle fixture 102 or workstand 110. The AGV 106 includes at least one controller 116, also labeled as CTL, and laser scanning sensors 118, also labeled as LSS 1, LSS 2, LSS 3 and LSS 4, on each of four sides of the AGV 106. The laser scanning sensors 118 are used for scanning the target features 112 using laser beams 120, in order to make distance measurements to the target features 112, as well as to identify convex zones 122 indicated by boxes with dashed outlines about the target features 112, as described in more detail below.

The controller 116 may comprise a general or special purpose computer or processor. Although only a single controller 116 is shown, multiple controllers 116 may be provided for respectively controlling the AGV 106 and the robots 108, and subsystems thereof. The controller 116 includes on-board memory storage in which various operating and control programs may be stored, as well as the maps for path planning and navigation.

In some embodiments, the AGV 106 may be fully autonomous and the controller 116 is programmed to carry out all operations automatically, including movement of the AGV 106 and control of the robot 108. However, in other embodiments, the AGV 106 may be only partially automated, and the controller 116 may require another system and/or operator to input instructions or commands to the AGV 106.

The controller 116 performs the path planning and navigation for the AGV 106, using simultaneous localization and mapping (SLAM) principles, guided by the laser scanner sensors 118 mounted on each of the four sides of the AGV 106. As noted above, the laser scanner sensors 118 are able to map objects in a 2-D plane of view that are few inches from the factory floor, and have been augmented to support distance measurements to the objects in the 2-D plane of view.

The challenge problem consists of two primary areas: (1) AGV 106 accuracy and repeatability in returning to taught node positions with a cradle fixture 102 or workstand 110 within a work cell 100, and (2) the ability to use the same taught node positions with other work cells 100 using other sets or copies of similar cradle fixtures 102 and workstands 110.

In one embodiment, a mathematical approach is applied by the path planning and navigation controller 116 that enables the AGV 106 to accurately and repeatedly return to the taught node positions using the laser scanner sensors 118 to map a model by using the target features 112 on the cradle fixtures 102 and workstand 110. This approach enables the use of laser scanner sensors 118 with a distance measurement error to a given target feature 112, including both systematic or bias errors and random errors, to filter the distance measurement error and remove a laser scanner sensor's 118 systematic or bias errors and thereby enable the path planning and navigation controller 116 of the AGV 106 to achieve the desired positional accuracy and repeatability relative to the cradle fixtures 102 or workstand 110 within the work cell 100.

In addition, this approach defines 2-D area bounds, i.e., the convex zones 122, around the target features 112 on the cradle fixtures 102 or workstand 110 in the work cell 100 to ensure that that mapping target features 112 identified by the laser scanner sensors 118 of the AGV 106 does not include other objects, thereby providing the AGV 106 with an accurate and consistent set of target features 112, without ambiguity, for its path planning and navigation controller 116. Coupled with this and given that the target features 112 on a cradle fixture 102 or workstand 110 of a reference work cell 100 are replicated, with metrological accuracy, on other set or copies of similar cradle fixtures 102 and workstands 110 across other work cells 100, the AGV 106 could use the same taught node positions from the reference work cell 100 across other work cells 100, thereby greatly mitigating the need for additional teaching and verification of taught node positions for a given work cell and factory level automation process, i.e., forward and aft fuselages, respectively.

This is described in more detail below, by contrasting the current mapping technique with the improved mapping technique.

Current Mapping Technique

1) The AGV's Accuracy and Repeatability in Returning to Taught Node Positions within a Work Cell The current mapping technique uses a simple measurement averaging of the measured distances by the laser scanner sensor 118. In this setup, the laser scanner sensor 118 is programmed to make multiple (in the range of 30 to 50) distance measurements to the objects including target features 112 within the laser scanner sensor's 118 FoR and FoV within a work cell 100. Then, the outlier distance measurements for any prior observed or taught objects are removed and a simple average is computed to determine the distance measurement for the particular observed or taught objects. These average distance measurements are then used to create the map of the 2-D plane of view as observed by the particular laser scanner sensor 118 within a given work cell 100. The creation of the observed 2-D map for a given work cell 100 from a given AGV 106 position based on the average distance measurements with possible systematic or bias errors from the laser scanner sensor 118 causes the total distance measurement errors (systematic or bias and random errors) to not enable the path planning and navigation controller 116 of the AGV 106 to achieve the desired accuracy and repeatability in returning to taught node positions within a work cell 100, i.e., the path planning and navigation controller 116 acts as a proportional-integral-derivative (PID) controller 116 using a combination of coarse motion steps followed by fine motion steps as it hunts for a desired position, wherein the controller 116 is expected to operate below the noise floor of the distance measurement input to the controller, i.e., noise in the sensed or observed inputs limit the controllability of the path planning and navigation controller 116. Due to the above stated uncertainties in the distance measurements of the map in 2-D plane, the AGV's 106 accuracy and repeatability in returning to taught node positions within a work cell 100 cannot be achieved with a high degree of confidence which, in turn, adversely impacts the work cell and factory level automation process.

2) the AGV's Ability to Use the Same Taught Node Positions, with Cradle Fixtures and a Workstand within the Particular Work Cell, Across Other Work Cells Using Other Sets or Copies of Similar Cradle Fixtures and Workstands The current mapping technique expects the objects other than the target features 112 within the laser scanner sensor's 118 FoR and FoV within a work cell 100 to present an identical view across all works cells 100 using other sets or copies of similar cradle fixtures 102 and workstands 110. It is assumed that the target features 112 on a cradle fixture 102 or workstand 110 in a reference work cell 100 are replicated, with metrological accuracy, on other sets or copies of similar cradle fixtures 102 and workstands 110 across other work cells 100. The laser scanner sensor 118 being used on any given side of the AGV 106 is able to scan across about 190 degrees and with a ranging distance specification of about 49 meters. Given these laser scanner sensor 118 specifications, there is a high likelihood that, in an operational environment, other static and dynamic objects beyond the target features 112 on the cradle fixture 102 or workstand 110 may be picked up. This can cause mapping ambiguity and uncertainties for the path planning and navigation controller 116 of the AGV 106 when moving the AGV 106 to the desired node position within the work cell 100 adjacent to the cradle fixtures 102 and/or workstand 110. In addition, this approach uses the four laser scanner sensors 118 mounted on each of the sides of the AGV 106, respectively. The laser scanner sensors 118 that are on the back and sides of the AGV 106 may pick up other static and dynamic objects that may vary from work cell 100 to work cell 100. This can cause variability in the dynamic map in the 2-D plane, resulting in an inability of the AGV 106 to effectively use the same taught node positions, with the cradle fixtures 102 and workstand 110 within the reference work cell 100, across other work cells 100 using other sets or copies of similar cradle fixtures 102 and workstands 110. Furthermore, the planned use of the laser scanner sensors 118 that are on the sides of the AGV 106, in addition to the laser scanner sensor 118 that is directly facing or adjacent to the cradle fixture 102 and/or workstand 110, may view target features 112 beyond a primary rigid body cradle fixture 102 or workstand 110 in consideration. A typical work cell 100 includes multiple cradles fixtures 102 to hold and position the fuselage assembly and a workstand 110. However, the separation distance between these multiple rigid body cradle fixtures 102 and workstand 110 are not accurate to the metrological requirements to ensure consistent and accurate view of the map in the 2-D plane across other work cells 100 using other sets or copies of similar cradle fixtures 102 and workstands 110. Therefore, using target features 112 that are beyond a single rigid body cradle fixture 102 or workstand 110 will lead to variability in the dynamic map in the 2-D plane resulting in an inability of the AGV 106 to effectively use the same taught node positions, with cradle fixtures 102 and a workstand 110 within the reference work cell 100, across other work cells 100 using other sets or copies of similar cradle fixtures 102 and workstands 110.

Improved Mapping Technique

1) The AGV's Accuracy and Repeatability in Returning to Taught Node Positions within a Work Cell The improved mapping technique performs offline calibration of the four laser scanner sensors 118 on each side of the AGV 106 against target reference points to determine the systematic or bias errors among the four laser scanner sensors 118 when performing ranging functions for distance measurements to objects within the laser scanner sensor's 118 FoV and thereby enable computational processes to remove the systemic or bias errors from the distance measurements to objects and target features 112.

This approach also performs an offline calibration process to determine the distribution and standard deviation of the distance measurements' random errors for each of the four laser scanner sensors 118 on each side of the AGV 106. Normally, the distribution of the distance measurements' random errors follows a Gaussian distribution, but this process confirms that, and if the sensor 118 does not follow an exact Gaussian distribution process, then a distribution lookup table can be constructed from the offline calibration process for greater fidelity in the computational processes. Often, the standard deviation of the distance measurement's random error as stated in the laser scanner sensor's 118 manufacturer specification is greater than what the particular sensor 118 actually achieves and hence one would use the standard deviation of the distance measurement's random error from the offline calibration process for greater fidelity in the computational processes. This approach removes the measured systematic or bias errors for the particular laser scanner sensor 118 from the distance measurements to specific objects associated with target features 112 from scans across the laser scanner sensor's 118 FoR.

Mathematical filter/estimator, such as the maximum-likelihood and Bayesian parameter estimation statistical techniques, are used to improve the accuracy of each of the laser scanner sensor's 118 distance measurements to a specific object or target feature 112. Application of a technique, such as a Recursive Bayesian Estimator, using the distribution and standard deviation of the distance measurements' random errors for the particular laser scanner sensor 118 from the offline calibration process, have been shown to significantly filter out the distance measurement's random error and thereby enable the AGV 106 to achieve the accuracy and repeatability in returning to taught node positions within a work cell 100.

2) the AGV's Ability to Use the Same Taught Node Positions, with Cradle Fixtures and a Workstand within the Particular Work Cell, Across Other Work Cells Using Other Sets or Copies of Similar Cradle Fixtures and a Workstand In the improved mapping technique, it is assumed that the target features 112 on a cradle fixture 102 or workstand 110 of a reference work cell 100 are replicated, with metrological accuracy, on other set or copies of similar cradle fixtures 102 or workstands 110 across other work cells 100.

This approach, when performing coarse and fine AGV 106 motion from a given node position to a next node position within a work cell 100, includes one or more of the following options:

- Use only the laser scanner sensor 118 that is directly facing or adjacent to the cradle fixture 102 or workstand 110. Alternatively, other laser scanner sensors 118 may be used, in addition the primary laser scanner sensor 118 that is directly facing or adjacent to the cradle fixture 102 or workstand 110, when these other laser scanner sensors 118 can view the target features 112 of the cradle fixture 102 or workstand 110.
- Use only target features 112 associated with a given cradle fixture 102 or workstand 110, and do not use static or dynamic objects within the work cell 100.
- Use only target features 112 associated with a single cradle fixture 102 or workstand 110 and, furthermore, use at least three target features 112 that are closest to the AGV 106, i.e., since a single cradle fixture 102 or workstand 110 has multiple target features 112, some on the near side and others on the far side of the cradle fixture 102 or workstand 110 relative to the AGV 106, wherein it is suggested that at least three of the target features 112 be from the near side of the cradle fixture 102 or workstand 110 relative to the AGV 106.

This approach defines a convex zone 122 around each of the target features 112 associated with the cradle fixtures 102 or workstand 110 in the work cell 100, such that the target feature 112 is completely located within the defined convex zone 122. The distance margin between the target feature's 112 perimeter and the defined convex zone's 122 perimeter is small, such that one would not expect any other foreign static or dynamic objects to occupy the annulus space formed between the target feature's 112 perimeter and the defined convex zone's 122 perimeter. The convex zone's 122 perimeter around a particular target feature 112 defines the distance measurement's threshold bounds to objects within the laser scanner sensor's 118 FoR that need to be included in the computational process, while the objects detected that are outside of the threshold bounds to the particular target feature 112 are ignored. This approach allows one to ignore the static and dynamic objects that vary from one work cell 100 to another, while also muting the variability, due to elements such as hoses, cables, etc., associated with a particular cradle fixture 102 or workstand 110 associated with a given work cell 100.

The processes for implementing the improved mapping technique for a work cell and factory level automation process are described in more detail below.

Offline Calibration Process

Figure 2:
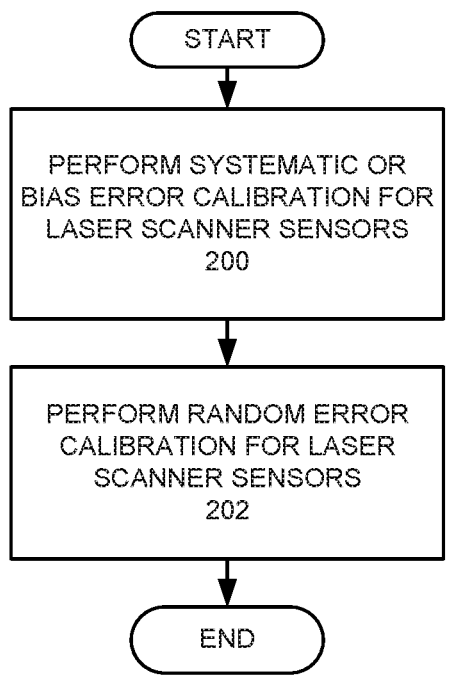
FIG. 2 is a flowchart illustrating the steps for performing an offline calibration process for an automated guided vehicle, according to one embodiment.

FIG. 2 is a flowchart illustrating the steps for performing an offline calibration process for the laser scanning sensors 118 of an AGV 106.

Block 200 represents the step of performing one or more calibrations of the laser scanner sensors 118, namely LSS 1 through LSS 4, on the AGV 106 to determine the systematic or bias errors in the distance measurements made by the laser scanner sensors 118.

Block 202 represents the step of performing one or more calibrations of the laser scanner sensors 118, namely LSS 1 through LSS 4, on the AGV 106 to determine the random errors in the distance measurements made by the laser scanner sensors 118.

The calibrations performed in Blocks 200 and 202 are offline calibrations of the laser scanner sensors 118 on the AGV 106 performed against target reference points to determine the systematic or bias errors and/or a distribution and standard deviation of the random errors in the distance measurements made by the laser scanner sensors 118. As noted above, the distribution of the random errors may comprise a Gaussian distribution or the distribution is stored in a table when the distribution does not comprise a Gaussian distribution.

Scanning Process

Figure 3:
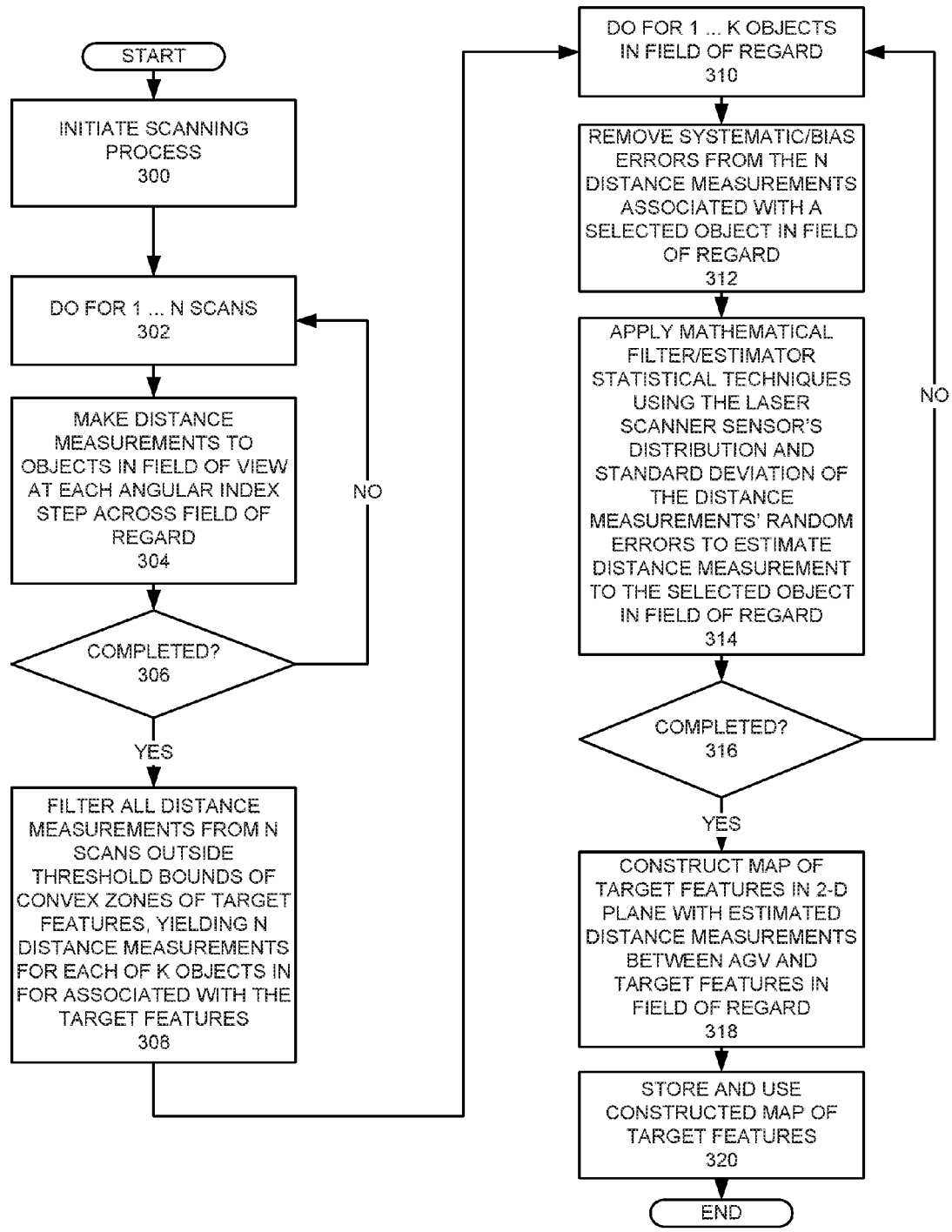
FIG. 3 is a flowchart illustrating the steps for performing a scanning process using the laser scanning sensors of an automated guided vehicle, according to one embodiment.

FIG. 3 is a flowchart illustrating the steps for performing a scanning process using the laser scanning sensors 118 of an AGV 106.

Block 300 represents the step of initiating the scanning process using the laser scanner sensors 118 of the AGV 106.

Blocks 302 through 306 represent a loop performed for 1 to N scans.

In each iteration of this loop, Block 304 represents the step of making one or more distance measurements of one or more objects within a work cell 100 using at least one laser scanner sensor 118 on an AGV 106. Specifically, this step makes distance measurements to objects in the FoV of the laser scanner sensor 118 of the AGV 106 at each angular index step across the FoR of the laser scanner sensor 118 of the AGV 106. In one embodiment, the distance measurements are made using only the laser scanner sensor 118 on the AGV 106 that is directly facing or adjacent to the cradle fixture 102 or workstand 110 within the work cell 100. In another embodiment, the distance measurements are made using more than one of the laser scanner sensors 118 on the AGV 106 across the FoR of the laser scanner sensors 118 on the AGV 106.

Block 306 is a decision block that determines whether N scans have been completed; if so, control transfers to Block 308; otherwise, control transfers back to Block 302 to perform the next iteration of the loop.

Block 308 represents the step of filtering the distance measurements of the objects that are not target features 112 on a cradle fixture 102 or workstand 110 within the work cell 100. Specifically, this step filters all distance measurements from the N scans that are outside the threshold bounds of the convex zones 122 defined for each target feature 112 associated with a single cradle fixture 102 or workstand 110 being scanned, yielding N distance measurements for each of K objects in the FoR associated with the target features 112. The convex zone 122 is defined around each of the target features 112 to exclude the objects that are not the target features 112. A distance margin between a perimeter of the target features 112 and a perimeter of the defined convex zone 122 is sufficiently small, such that no other static or dynamic objects occupy an annulus space formed between the perimeter of the target features 112 and the perimeter of the defined convex zone 122. Distance measurements that are outside a threshold bounds of the convex zones 122 defined around each of the target features 112 are filtered, yielding the filtered distance measurements for each of the objects in the FoR of the laser scanner sensor 118 on the AGV 106.

Blocks 310 through 316 represent a loop performed for 1 to the K objects in the FoR.

In each iteration of this loop, Block 312 represents the step of removing systematic or bias errors of the laser scanner sensor 118 from the filtered distance measurements, i.e., each of the N distance measurements associated with a selected object in the FoR, and Block 314 represents the step of applying a mathematical filter or estimator, such as a Recursive Bayesian Estimator, to the filtered distance measurements using the distribution and standard deviation of the random errors of the laser scanner sensor 118 to generate estimated distance measurements to the selected object in the FoR.

Block 316 is a decision block that determines whether the K objects in the FoR have been completed; if so, control transfers to Block 318; otherwise, control transfers back to Block 310 to perform the next iteration of the loop.

Block 318 represents the step of constructing a map of the target features 112 on the cradle fixtures 102 or workstand 110 within the work cell 100 using the estimated distance measurements in the 2-D plane of view between the AGV 106 and the target features 112 in the FoR of the laser scanner sensors 118.

Block 320 represents the step of storing the constructed map of the target features 112 in the 2-D plane of view in the path planning and navigation controller 116 of the AGV 106 and using the constructed map for path planning and navigation control of the AGV 106 relative to the cradle fixtures 102 or workstand 110 within the work cell 100. Specifically, the constructed map enables the AGV 106 to accurately and repeatedly return to one or more taught node positions within the work cell 100.

The AGV 106 returns to the taught node positions within an acceptable positional accuracy, i.e., it need not be the exact position but within a specified tolerance to a high degree of confidence. Consequently, there are two aspects: (1) the ability of the AGV 106 to be taught to arrive at a node position within the acceptable positional accuracy, and (2) subsequently when the AGV is commanded to return to the taught node position within the acceptable positional accuracy, thereby achieving positional repeatability.

Moreover, when the work cell 100 is a reference work cell 100, the constructed map enables the AGV 106 or another AGV 106 to accurately and repeatedly return to taught node positions within one or more other work cells 100, when a cradle fixture 102 or workstand 110 within the other work cells 100 is positioned in the same manner as the cradle fixture 102 or workstand 110 within the reference work cell 100.

Airplane Assembly

Figure 4:
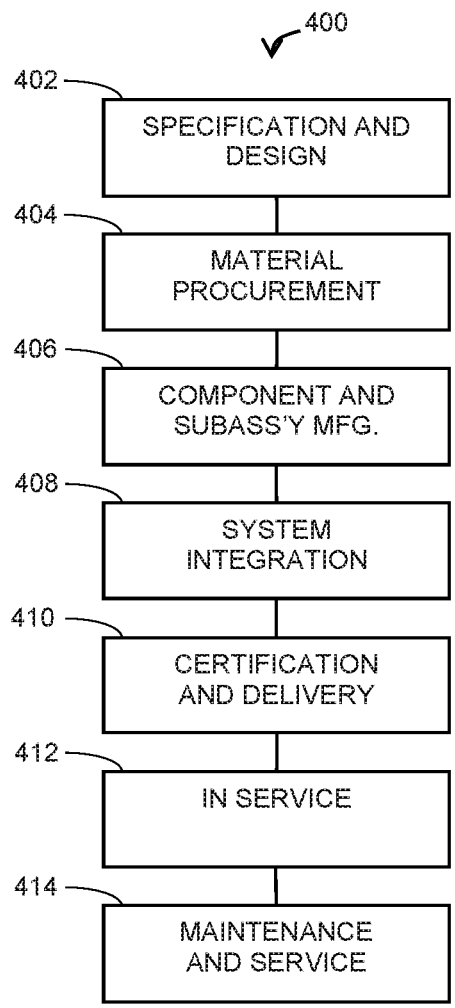
FIG. 4 is a flow diagram of aircraft production and service methodology, according to one embodiment.
Figure 5:
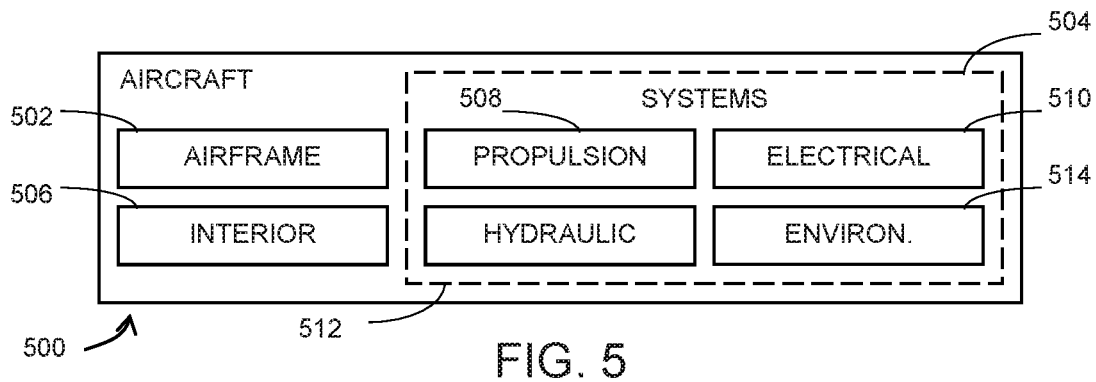
FIG. 5 is a block diagram of an aircraft, according to one embodiment.

Embodiments of the disclosure may be described in the context of an aircraft manufacturing and service method 400 as shown in FIG. 4 and an aircraft 500 as shown in FIG. 5.

As shown in FIG. 4, during pre-production, exemplary method 400 may include specification and design 402 of the aircraft 500 and material procurement 404. During production, component and subassembly manufacturing 406 and system integration 408 of the aircraft 500 takes place, which include the work cell and factory level automation using the AGV 106, controller 116 and laser scanner sensors 118 described herein. Thereafter, the aircraft 500 may go through certification and delivery 410 in order to be placed in service 412. While in service by a customer, the aircraft 500 is scheduled for routine maintenance and service 414 (which includes modification, reconfiguration, refurbishment, and so on), that also includes the work cell and factory level automation using the AGV 106, controller 116, and laser scanner sensors 118 described herein.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 5, the aircraft 500 produced by exemplary method 400 may include an airframe 502 with a plurality of systems 504 and an interior 506. Examples of high-level systems 504 include one or more of a propulsion system 508, an electrical system 510, a hydraulic system 512, and an environmental system 514. Any number of other systems may be included. Although an aerospace example is shown, the principles of the invention may be applied to other industries, such as the automotive industry.

Apparatus and methods embodied herein may be employed during any one or more of the stages of the production and service method 400. For example, components or subassemblies corresponding to production process 406 may be fabricated or manufactured in a manner similar to components or subassemblies produced while the aircraft 500 is in service. Also, one or more apparatus embodiments, method embodiments, or a combination thereof may be utilized during the production stages 406 and 408, for example, by substantially expediting assembly of or reducing the cost of an aircraft 500. Similarly, one or more of apparatus embodiments, method embodiments, or a combination thereof may be utilized while the aircraft 500 is in service, for example and without limitation, to maintenance and service 414.

BENEFITS

The embodiments described herein provide a number of benefits, such as the potential for significant value by enabling the application of factory automation for an airplane assembly and build process that directly enables significant improvements in manufacturing rate, quality and safety, while mitigating costs.

The embodiments described herein are equally applicable to and leveraged in other manufacturing areas beyond aerospace applications. For example, there is potential for use by other companies in other industries to achieve full work cell and factory level automation within a hierarchical supervisory control system composed of discrete event dynamic systems. This may include aircraft manufacturers, electrical and electronics equipment manufacturers, automotive manufacturers, and factory automation vendors.

ALTERNATIVES

The description of the different embodiments set forth above has been presented for purposes of illustration and description, and is not intended to be exhaustive or limited to the embodiments in the form disclosed. Many modifications and variations will be apparent to those of ordinary skill in the art.

Specifically, devices other than AGVs and laser scanner sources may be used. Moreover, different methods and steps may be performed. Finally, the use and arrangement of work cells, cradle fixtures, workstands, target features and the like may be different from those disclosed herein.

It is intended that the scope of the invention be limited not by this detailed description, but rather by the claims appended hereto.

What is claimed is:

1. A method for work cell and factory level automation, comprising:
    making one or more distance measurements of one or more objects within a work cell using at least one laser scanner sensor on an automated guided vehicle (AGV);
    filtering the distance measurements of the objects that are not target features on a cradle fixture or workstand within the work cell;
    removing systematic or bias errors of the laser scanner sensor from the filtered distance measurements;
    applying a mathematical filter or estimator to the filtered distance measurements using random errors of the laser scanner sensor to generate estimated distance measurements;
    constructing a map of the target features on the cradle fixture or workstand within the work cell using the estimated distance measurements; and
    using the constructed map for path planning and navigation control of the AGV relative to the cradle fixture or workstand within the work cell.

2. The method of claim 1, wherein the making step comprises using the laser scanner sensor on the AGV that is directly facing or adjacent to the cradle fixture or workstand within the work cell.

3. The method of claim 1, wherein the at least one laser scanner sensor comprises a plurality of laser scanner sensors and the making step comprises using more than one of the laser scanner sensors on the AGV across a Field of Regard (FoR) of the laser scanner sensors on the AGV.

4. The method of claim 1, wherein the making step comprises making the distance measurements to the objects in a Field of View (FoV) of the laser scanner sensor on the AGV at an angular index step across a Field of Regard (FoR) of the laser scanner sensor on the AGV.

5. The method of claim 1, wherein the constructing step comprises constructing the map of the target features in a two-dimensional (2-D) plane of view using the estimated distance measurements.

6. The method of claim 1, wherein the constructed map enables the AGV to accurately and repeatedly return to one or more taught node positions within the work cell.

7. The method of claim 6, wherein the work cell is a reference work cell and the constructed map enables the AGV or another AGV to accurately and repeatedly return to the taught node positions within one or more other work cells, when a cradle fixture or workstand within the other work cells is positioned the same as the cradle fixture or workstand within the reference work cell.

8. The method of claim 1, further comprising performing one or more calibrations of the laser scanner sensor on the AGV to determine the systematic or bias errors and random errors in the distance measurements made by the laser scanner sensor.

9. The method of claim 8, wherein the performing step comprises performing offline calibration of the laser scanner sensor on the AGV against target reference points to determine the systematic or bias errors in the distance measurements made by the laser scanner sensor.

10. The method of claim 8, wherein the performing step comprises performing offline calibration of the laser scanner sensor on the AGV against target reference points process to determine a distribution and standard deviation of the random errors in the distance measurements made by the laser scanner sensor on the AGV.

11. The method of claim 10, wherein the distribution comprises a Gaussian distribution.

12. The method of claim 10, wherein the distribution is stored in a table when the distribution does not comprise a Gaussian distribution.

13. The method of claim 1, wherein the filtering step comprises defining a convex zone around at least one of the target features to exclude the objects that are not the target features.

14. The method of claim 13, wherein the filtering step comprises filtering the distance measurements that are outside a threshold bounds of the convex zones defined around the target features, yielding the filtered distance measurements for each of the objects in a Field of Regard (FoR) of the laser scanner sensor on the AGV.

15. The method of claim 13, wherein a distance margin between a perimeter of the target features and a perimeter of the defined convex zone is sufficiently small, such that no other static or dynamic objects occupy an annulus space formed between the perimeter of the target features and the perimeter of the defined convex zone.

16. An apparatus for work cell and factory level automation, comprising:
- an automated guided vehicle (AGV) including at least one laser scanner sensor and a controller, wherein the controller is operable for:
  - making one or more distance measurements of one or more objects within a work cell using the laser scanner sensor on the AGV;
  - filtering the distance measurements of the objects that are not target features on a cradle fixture or workstand within the work cell;
  - removing systematic or bias errors of the laser scanner sensor from the filtered distance measurements;
  - applying a mathematical filter or estimator to the filtered distance measurements using random errors of the laser scanner sensor to generate estimated distance measurements;
  - constructing a map of the target features on the cradle fixture or workstand within the work cell using the estimated distance measurements; and
  - using the constructed map for path planning and navigation control of the AGV relative to the cradle fixture or workstand within the work cell.

17. A method for work cell and factory level automation, comprising:
- filtering one or more distance measurements of one or more objects that are not target features on a cradle fixture or workstand within a work cell;
- removing systematic or bias errors of one or more laser scanner sensors on an automated guided vehicle (AGV) from the filtered distance measurements;
- applying a mathematical filter or estimator to the filtered distance measurements using random errors of the laser scanner sensors to generate estimated distance measurements;
- constructing a map of the target features on the cradle fixture or workstand within the work cell using the estimated distance measurements; and
- using the constructed map to enable the AGV to accurately and repeatedly return to one or more taught node positions within the work cell.

18. The method of claim 17, wherein the constructed map enables the AGV to accurately and repeatedly return to one or more taught node positions within one or more other work cells.

19. The method of claim 17, wherein the constructing step comprises constructing the map of the target features in a two-dimensional (2-D) plane of view using the estimated distance measurements.

20. The method of claim 17, further comprising making the distance measurements of the objects within the work cell using the laser scanner sensors on the AGV.

21. The method of claim 20, further comprising performing one or more calibrations of the laser scanner sensors on the AGV to determine the systematic, bias, or random errors in the distance measurements made by the laser scanner sensor.

22. The method of claim 20, wherein the making step comprises using the laser scanner sensors on the AGV across a Field of Regard (FoR) of the laser scanner sensors on the AGV.

23. The method of claim 20, wherein the making step comprises making the distance measurements to the objects in a Field of View (FoV) of the laser scanner sensors on the AGV at an angular index step across a Field of Regard (FoR) of the laser scanner sensors on the AGV.

24. The method of claim 17, wherein the filtering step comprises defining a convex zone around at least one of the target features to exclude the objects that are not the target features.

25. The method of claim 24, wherein a distance margin between a perimeter of the target features and a perimeter of the defined convex zone is sufficiently small, such that no other static or dynamic objects occupy an annulus space formed between the perimeter of the target features and the perimeter of the defined convex zone.

26. The method of claim 24, wherein the filtering step comprises filtering the distance measurements that are outside a threshold bounds of the convex zones defined around the target features, yielding the filtered distance measurements for each of the objects in a Field of Regard (FoR) of the laser scanner sensors on the AGV.

* * * * *